(12) United States Patent
Macpherson et al.

(10) Patent No.: US 8,257,770 B2
(45) Date of Patent: Sep. 4, 2012

(54) METHOD OF MAXIMIZING UTILIZATION OF EGG ALBUMEN

(75) Inventors: Stewart Macpherson, Bondi Junction (AU); Ross Macpherson, Putney (AU)

(73) Assignee: Southside Coldstores Pty Ltd (AU)

( * ) Notice: Subject to any disclaimer, the term of this patent is extended or adjusted under 35 U.S.C. 154(b) by 610 days.

(21) Appl. No.: 12/425,468

(22) Filed: Apr. 17, 2009

(65) Prior Publication Data

US 2009/0263561 A1 Oct. 22, 2009

(30) Foreign Application Priority Data

Apr. 17, 2008 (AU) ................................ 2008901856

(51) Int. Cl.
*A23L 1/32* (2006.01)

(52) U.S. Cl. .......................... 426/496; 426/614; 426/391

(58) Field of Classification Search ................... 426/614
See application file for complete search history.

(56) References Cited

U.S. PATENT DOCUMENTS

| | | | | |
|---|---|---|---|---|
| 3,769,404 A * | 10/1973 | Latham et al. | ................. | 426/614 |
| 4,738,855 A * | 4/1988 | Kuroda et al. | .................. | 426/72 |
| 6,726,951 B2 * | 4/2004 | Campbell et al. | ............. | 426/614 |
| 2008/0003335 A1 * | 1/2008 | Singh et al. | .................... | 426/299 |
| 2011/0274798 A1 * | 11/2011 | Watanabe et al. | ............. | 426/298 |

* cited by examiner

*Primary Examiner* — Anthony Weier

(74) *Attorney, Agent, or Firm* — Fulbright & Jaworski L.L.P.

(57) ABSTRACT

A food product formulation which includes dried hen egg albumen (white), wherein the level of said albumen in said formulation is based on the water absorption or water binding (gelling) capacity of said albumen.

9 Claims, No Drawings

METHOD OF MAXIMIZING UTILIZATION OF EGG ALBUMEN

CROSS-REFERENCE TO RELATED APPLICATIONS

This application claims priority for Application 2008901856 filed on Apr. 17, 2008 in Australia.

TECHNICAL FIELD

The invention relates to the field of commercial food product formulation. In particular, the invention relates to the optimisation of food product formulations containing hen egg with respect to raw material cost.

BACKGROUND OF THE INVENTION

Hen egg is a staple food formulation ingredient in many food areas, including pet foods. It provides functional and nutritional fat, primarily via the yolk, and functional and nutritional protein, primarily via the albumen (or 'white').

The egg albumen is valued for its ability to form stable gels, to bind water and as a whipping agent to provide stable foams in food systems. The egg yolk is primarily valued as an emulsifying agent.

It is also known that if the egg white contaminates the egg yolk, it will tend to have a deleterious effect on this emulsifying ability. Equally, if the albumen is contaminated by the fat (from the yolk), this will dramatically reduce the functionality of the albumen, making it ineffective as a gelling or whipping agent.

In order to simplify the disclosure of the invention, reference will be made in this document to a 'typical' whole egg product, which will be familiar to those skilled in the art. The typical whole egg product comprises approximately 30% 'wet' yolk and 70% 'wet' albumen by mass. The yolk itself is comprised of approximately 50.8% solids and 49.2% water by mass; the albumen is comprised of approximately 11.8% solids and 88.2% water by mass (or put another way a water: solids ratio of about 7.5:1.

The total combined whole egg solids comprise approximately 24.2% by mass and the total water in the whole egg is approximately 75.8% by mass. While these numbers may differ in individual eggs, they are well known reference points for the content of hen eggs.

An important consideration in the supply of these egg components is the ability to provide a sufficient shelf-life for the storage and transport of the products before use. In the liquid form, the shelf life of the egg components is quite short. Pasteurising the liquid egg is known in the art. Typically, the liquid egg may be pumped through a heat exchanger at, for example, 64° C. for approximately 3 minutes, in order to produce, for example, a nine log cycle reduction in the occurrence of *Listeria monocytogenes* in the dried albumen or in the liquid egg. However, this temperature is not optimal for maintaining functionality, particularly of the albumen, as a substantial proportion of the albumen proteins will tend to denature at this temperature. However, this temperature is maintained in order to ensure sufficient heat treatment of the yolk and the albumen.

This method also does not offer the opportunity to optimise the usage of the white and yolk relative to one another.

Another well-known approach to the issue of providing enhanced shelf-life to egg products, whether whole egg or individual components such as yolk and albumen, is to dry the product. Typically, the albumen might be spray dried. In addition, the albumen might be pasteurised in either the wet or dry state to further promote the shelf life. This dramatically increases shelf life, but with a concomitant increase in the cost of the materials, due to the processing cost, and a potential lowering of functionality, due to heat denaturation of the proteins.

The dried whole egg, or combination of dried egg yolk and albumen, is then incorporated into the food product formulation. It replaces whole egg at a level which would replicate the level of yolk solids and albumen solids which would be provided by the whole egg being replaced.

In all applications of which the inventors are aware, this leads to the practice of incorporation of dried albumen and dried yolk at an equivalent 'wet' solids ratio of about 70:30, as per the typical wet whole egg composition, and an addition of 'replacement' water in the formulation at a ratio of about 3:1 to total egg solids added. Put another way, on a dry solids basis the typical formulation represents an egg albumen solids to egg yolk solids ratio of approximately 1:0.54.

However, this often means an overall increase in formulation cost, as the recombination of egg yolk, egg albumen and water inevitably carries a higher material cost than that of whole egg that is processed unseparated.

Accordingly it is an object of the invention to provide alternative formulations for food products containing dried egg yolk and dried egg albumen with optimised raw material formulation cost.

BRIEF SUMMARY OF THE INVENTION

According to one aspect of the invention, there is provided a food product formulation which includes dried hen egg albumen (white), wherein the level of said albumen in said formulation is based on the water absorption or water binding (gelling) capacity of said albumen. The term 'food product' includes any food type, including pet food.

This is the key to the invention: the surprising and novel realisation that the dried egg albumen solids that have been dried and pasteurised under optimised temperature conditions, can recombine with a greater proportion of water than was removed from them during processing into the dried form. This obviates the accepted practices of egg product formulation regarding whole egg replacement: as outlined above the practice is to replace egg albumen and egg yolk at a 'wet' ratio of approximately 70:30 and replace water to total egg solids at approximately 3:1, in keeping with the typical content of whole egg.

In all cases in this document where reference is made to 'food products', this is to be construed to refer to both human food and animal food products, specifically including pet foods which include inedible egg material.

Albumen which has been dried under optimised conditions, in order to produce higher gel strengths, has been found to be able to absorb water at a water:solids ratio of at least 12:1, and potentially higher depending on the actual drying conditions used. This albumen product is commonly known in the field as 'hi-gel' or 'high gel' albumen: it is simply defined as an albumen having an elevated gel strength as compared to the albumen dried under non-optimised conditions as known in the prior art.

The invention allows the formulator to reformulate dried (whole) egg and water (make-up) into the formulation at an overall ratio where, due to the additional water binding ability of the hi-gel albumen, a greater mass of functional egg material is provided than would be the case with the naturally occurring liquid levels of 70:30, i.e. more water is added to the formulation overall. However, product quality is typically maintained, in spite of the increased water inclusion, due to the increased water absorption or binding capacity of the dried albumen relative to the prior art. This in turn may tend to reduce the raw material cost for the same mass of product produced (especially valuable where the cost of albumen per unit mass is higher than that of yolk) as water is typically a zero cost ingredient. Put another way, water is formulated into the food product at a ratio of greater than 3:1 versus total egg solids.

The wet egg albumen to egg yolk replacement ratio may vary according to the aesthetic requirements of the food product, but in any case yields of the food product (versus total dry solids) are increased due the extra bound water in the egg albumen.

According to another aspect of the invention, there is provided a food product formulation incorporating dried hen egg albumen and extra water than would typically be incorporated in said formulation by reference to a given mass of solids in said formulation, wherein the increased water inclusion is facilitated by incorporation of dried hen egg albumen in the formulation. This type of food formulation has the same advantages as described above.

Preferably, and particularly, the level of albumen is chosen with primary reference to the water absorption or water binding (gelling) capacity of said albumen. As discussed above, this is the key to the invention.

More preferably, and particularly, said food formulation contains dried egg yolk solids and dried egg albumen solids, wherein the level of albumen solids included in said formulation is lower than would be provided by whole egg at an equivalent egg yolk solids level; and wherein an amount of water is included in said formulation to replace the water which would otherwise be provided by whole egg at an equivalent egg yolk solids level, wherein said amount of water is greater than would typically be provided by said whole egg at an equivalent egg yolk solids level.

Another aspect of the invention is that the understanding of the abilities of the egg albumen solids also provides the formulator with a method of increasing the yield of food products from a formulation based on a given mass of solids in said formulation by incorporation of extra water in said formulation, wherein the increased water inclusion is facilitated by incorporation of dried hen egg albumen in the formulation.

Preferably, the level of albumen is chosen with primary reference to the water absorption or water binding (gelling) capacity of said albumen. More particularly, said food formulation contains dried egg yolk solids and dried egg albumen solids, wherein the level of albumen solids included in said formulation is lower than would be provided by whole egg at an equivalent egg yolk solids level; and wherein an amount of water is included in said formulation to replace the water which would otherwise be provided by whole egg at an equivalent egg yolk solids level, wherein said amount of water is greater than would typically be provided by said whole egg at an equivalent egg yolk solids level.

In a more particular aspect, the invention provides a method of formulating a food product, said food product including hen egg yolk and dried hen egg albumen as an alternative to whole hen egg, said method including the steps of:

determining the proportion of said whole egg equivalent required in said formulation;

adding an approximately equivalent level of said hen egg yolk to the formulation as would be provided by said whole egg level;

adding less of said dried hen egg albumen to the formulation than would be provided by the equivalent level of albumen solids in said whole egg;

adding additional water to the formulation to facilitate achievement of the desired organoleptic properties of said food product, wherein the water added is greater than the level of water that would be required to replace the water provided by said whole egg.

The above is a practical expression of how the invention facilitates a method of improving the profitability of a food formulation.

In addition to the above formulations and methods, which assume formulation at constant market values for components such as whole egg, dried egg yolk, dried egg albumen and water, the invention also provides an opportunity for the formulator to respond to movements in the market price of these components.

Accordingly, there is provided a method of optimising the raw material cost of a food formulation containing egg yolk and egg albumen by taking advantage of the water absorption or water binding (gelling) capacity of said albumen to reduce the addition of egg albumen and/or increase the water level in the formulation, said method including the steps of:

(a) determining the level of whole egg equivalent required by the formulation to achieve target product quality;

(b) calculating the equivalent level of egg yolk solids and egg albumen solids implied by said level of whole egg, based on a predetermined typical proportion of egg yolk to egg albumen in whole egg and a predetermined typical water level in whole egg;

(c) calculating the level of water contained in said equivalent level of albumen in said whole egg level based on a typical water absorption ratio for egg albumen;

(d) calculating the level of water that can be added to the formulation in conjunction with the egg yolk solids and egg albumen solids as a replacement for whole egg, based on a predetermined water absorption ratio for egg yolk solids and a predetermined water absorption ratio for egg albumen, wherein said predetermined water absorption ratio for egg albumen is greater than that assumed in step (c).

Typically, the above method might rely on one or more of the following assumptions: said predetermined typical proportion of wet egg albumen to egg yolk in whole egg is approximately 70:30 by mass: said predetermined typical water level in whole egg is approximately 75% by mass: said typical water absorption ratio for egg albumen is approximately 7:1 water:solids by mass; said predetermined water absorption ratio for egg yolk is at least 1.25:1 water:solids by mass.

The above method might advantageously be further adapted to facilitate a raw material cost optimisation calculation method, which may be automated, wherein an optimum formulation material cost is determined with respect to cost of egg albumen and increased water level, said method further including the steps of:

(e) calculating the contribution of recipe cost of formulation material by said egg albumen solids by comparing the combined cost of the egg yolk solids and the egg albumen solids with the cost of the equivalent whole egg level;

(f) calculating the formulation cost saving facilitated by the addition of extra water per total solids in the formulation facilitated by the substitution of egg albumen solids;

(g) comparing the additional cost identified in step (e) with the cost saving identified in step (f) and;

optionally repeating steps (d) through (g), using a different predetermined water absorption ratio for egg albumen until the maximum advantageous difference is achieved between the additional cost identified in step (e) and the cost saving identified in step (f) is obtained.

Now will be described, with reference to specific, non-limiting examples, preferred embodiments of the invention.

DETAILED DESCRIPTION OF THE INVENTION

The invention is illustrated below by reference to particular examples where common egg-containing food products have been reformulated in accordance with the invention. In particular, the inventors have identified bakery-type food products as good vehicles for the invention, however it will be understood by those skilled in the art that the applicability of the invention will extend to food products where the increased gelling capacity of optimally dried egg albumen can be utilised.

In the following examples, reference is made to the 'gel strength' of the egg albumen. This parameter is well known in the art and relates to a method of testing the physical strength of a gel formed by dispersion of the egg albumen in water, followed by cooking.

A typical method of measuring gel strength in liquid egg albumen, well known to those skilled in the art, is as follows:
1. The albumen is filled into a container, such as a sausage casing;
2. The casing is then cooked until all protein is denatured, forming a gel, then cooled;
3. The casing is removed;
4. A rheometer, is then used to determine the force required (in Newtons) to cause the gel to break.

A typical method of measuring gel strength in dried egg albumen, well known to those skilled in the art, is as follows:
1. The albumen is dispersed in water, at a water:solids ratio of 7:1;
2. The mixture is filled into a container, such as a sausage casing;
3. The casing is then cooked until all protein is denatured, then cooled;
4. The casing is then removed;
5. A rheometer, is then used to determine the force required (in Newtons) to cause the gel to break.

The gel strength of typical wet pasteurised (54.9° C. for 4 minutes), dried egg albumen gel strength would be about 250N. However, it is possible to produce gel strengths of 600N or higher by applying more favourable pasteurising conditions to the albumen, for example by processing at lower than 55° C. for 4 minutes, or, as another example, by spray drying non-pasteurised albumen, followed by a slow 'dry' pasteurisation at temperatures of 60° C. to 70° C. for 7 to 10 days. These times and temperatures are merely indicative of typical dry pasteurisation conditions for egg albumen to produce for example, a nine log cycle reduction in the occurrence of *Listeria monocytogenes* in the dried albumen.

What the inventors have realised and demonstrated is that egg albumen that has higher gel strength can not only be used at 'standard' solids formulation levels to produce a 'stronger' product at constant water addition, but could alternatively be included at a lower solids addition rate, to produce a lower recipe cost as equivalent product quality, or could alternatively be used at the same solids addition rate to facilitate the addition of higher water levels to the formulation, without adversely affecting product quality. This thereby improves recipe yield on a constant solids basis. It is also possible to use a combination of the approaches.

Example 1

Bakery Muffins

The following trial was based on a commercial bakery muffin formulation. A comparison was made between performance of the same dry material formulation with three different types of egg solids source, including an egg replacement formulation in accordance with the present invention, wherein the albumen was spray dried in a non-pasteurised state and then dry-pasteurised in a hot room at 62° C. for 10 days, thereby retaining a gel strength of at least about 550 N as per the test described above. This high gel strength albumen was formulated in the recipe in a manner devised to improve the yield of muffins per unit mass of the commercial bakery muffin formulation.

In all cases, the water added to 1000 g was varied. In batch 1, which included whole egg, 225 g of extra water was added to the dry muffin pre-mix (said dry pre-mix including flour, sugar, shortening etc.), in accordance with a typical formulation.

In batch 2, which contained a commercially available dried whole egg powder, 262.5 g of extra water was added to take account of the extra 'make-up' water required to re-hydrate the dried egg, based on the typical re-hydration rate applied to dried egg.

In batch 3, which contained a commercial dried egg yolk and a high-gel dried albumen according to the invention, 469 g of extra water was added, the further water over batch 2 representing the greater water absorption capacity of the high-gel albumen (13:1 in this case). The formulations are indicated in Table 1.

The mixture was then blended in a Hobart mixer, using a flat beater. The mixing regime was: 1 min. at low speed; 4 min. at higher speed; 1 min. at low speed.

The batter was then divided into 105 g lots in muffin baking pans and baked at 175° C. for 22 minutes.

TABLE 1

| Batch No. & Type | | Premix (g) | Premix water (ml) | Oil (ml) | Liquid egg/egg solids (g) | Egg water (g) | Batter (g) | Yield (muffins) |
|---|---|---|---|---|---|---|---|---|
| 1 | Liquid whole egg | 1000 | 225 | 275 | 350 | 0 | 1850 | 17.619 |
| 2 | Dry whole egg | 1000 | 225 | 275 | 87.5 | 262.5 | 1850 | 17.619 |
| 3 | 70:30 blend of dried yolk solids and dried hi-gel albumen | 1000 | 225 | 275 | 87.5 | 469 | 2056 | 19.58 |

All of the batches of muffins were of similar crust, colour and texture.

The greater awareness of the water binding properties of egg albumen that underpins the invention has facilitated the addition of an extra 207 g of water into the recipe without sacrificing product quality.

This above example clearly demonstrates the ability of the inventive concept to provide a benefit to the formulator by allowing 42.5% extra water into the recipe, which translates in to an extra 1.96 muffins for an equivalent mass of pre-mix solids, the additional muffin mass being water which is commonly formulated at zero raw material cost.

Equally, it will be clear to the skilled person the batch 3 represents a substantial reduction in formulation cost relative to the standard egg pulp recipe in batch 1.

Example 2

Sponge Cake

This example relates to a standard sponge cake formulation and demonstrates the formulation cost saving possible where egg albumen is formulated with reference to its water binding (gelling) capacity.

The albumen gel strength in this example is 500N. At this gel strength, the water-absorbing capacity of the albumen is expected to be at least 12:1. Yolk water-absorbing capacity is expected to be 1.25:1.

The 'basic' sponge cake formulation, using dried whole egg, is shown as batch 4 in table 2 below. Batch 5 is a formulation where the inventive concept of matching water addition to dried hi-gel water absorption capacity has been applied.

The combination of the sponge premix, egg yolk, egg albumen and water is collectively known as the 'batter', when mixed.

TABLE 2

| Batch No. & Type | Sponge Premix (g) | Premix water (ml) | Liquid whole egg (g) | Egg solids (g) | Egg hydration water (g) | Batter (g) |
|---|---|---|---|---|---|---|
| 0 | Liquid whole egg | 1000 | 350 | 400 | | | 1750 |
| 4 | Dry whole egg | 1000 | 350 | | 100 | 300 | 1750 |
| 5 | 70:30 blend of dried yolk solids and dried hi-gel albumen | 1000 | 350 | | 100 | 448 | 1898 |

For batch 5 in table 2, the formulation is based on use of 70 g dried egg yolk and 30 g dried hi-gel egg albumen.

The standard premix formulation water requirement (excluding any water requirement for re-hydration of egg solids, e.g. if liquid whole egg were to be used) is 350 g.

Accordingly, the typical mass of batter based on commonly used dry whole egg re-hydration rate of 3:1, and ignoring the extra water absorption capacity identified by the inventors:
=1000 g premix+350 g standard water+100 g egg solids+ 300 g egg 'make-up' water
=1750 g batter (as per batch 4)

The increased egg 'make-up' water addition to the dry material in batch 5, which is facilitated by the properties of the hi-gel albumen is:
Egg water (g)=(70 g yolk solids×1.25 water absorption factor)+(30 g albumen solids×12 water absorption factor)
=448 g water.
Accordingly, the total batter mass for batch 5 is:
=1000 g premix+350 g standard water+100 g egg solids+ 448 g egg 'make-up' water
=1898 g batter This represents an extra 148 g of batter produced per 1000 g of premix, or an increased final yield of 100×(148/1750)= 8.45% with respect to 1000 g of premix, which is obviously very attractive to the commercial bakery.

It will be appreciated by those skilled in the art that the above examples provide merely an illustration of the inventive concept. Other embodiments may be readily conceived of which, while different in some details, nevertheless fall within the spirit and scope of the invention. For example, it would be clear that the invention is applicable to all potential food related end-uses of the egg material, including pet food formulations.

What is claimed is:

1. A method of reducing the raw material cost for the same mass of bakery food products manufactured from a solids plus water formulation having a given mass of solids in said formulation, comprising the step of: incorporating additional water in said formulation, wherein the increased water inclusion is facilitated by incorporation in the solids of dried hen egg albumen (white) that has been dried in a manner that increases its water binding (gelling) capacity to at least 12:1 water:solids mass.

2. The method of claim 1, wherein said bakery food formulation contains dried egg yolk solids and dried egg albumen solids, wherein the level of albumen solids included in said formulation is lower than would be provided by whole egg at an equivalent egg yolk solids level; and wherein an amount of water is included in said formulation to replace the water which would otherwise be provided by whole egg at an equivalent egg yolk solids level, wherein said amount of water is greater than would typically be provided by said whole egg at an equivalent egg yolk solids level.

3. A method of formulating a bakery food product, said food product including hen egg yolk and dried hen egg albumen (white) that has been dried in a manner that increases its water binding (gelling) capacity to at least 12:1 water:solids by mass as an alternative to whole hen egg, said method including the steps of:

determining the proportion of said whole egg equivalent required in said formulation;

adding an approximately equivalent level of said hen egg yolk to the formulation as would be provided by said whole egg level;

adding less of said dried hen egg albumen to the formulation than would be provided by the equivalent level of albumen solids in said whole egg;

adding additional water to the formulation to facilitate achievement of the desired organoleptic properties of said food product, wherein the water added is greater than the level of water that would be required to replace the water provided by said whole egg.

4. A method of optimising the raw material cost of a bakery food formulation containing egg yolk and egg albumen that has been dried in a manner that increases its water binding (gelling) capacity to at least 12:1 water:solids by mass by taking advantage of the water absorption or water binding (gelling) capacity of said albumen to reduce the addition of egg albumen and/or increase the water level in the formulation, said method including the steps of:

(a) determining the level of whole egg equivalent required by the formulation to achieve target product quality;

(b) calculating the equivalent level of egg yolk solids and egg albumen solids implied by said level of whole egg, based on a predetermined typical proportion of egg yolk to egg albumen in whole egg and a predetermined typical water level in whole egg;

(c) calculating the level of water contained in said equivalent level of albumen in said whole egg level based on a typical water absorption ratio for egg albumen;

(d) calculating the level of water that can be added to the formulation in conjunction with the egg yolk solids and egg albumen solids as a replacement for whole egg, based on a predetermined water absorption ratio for egg yolk solids and a predetermined water absorption ratio for egg albumen, wherein said predetermined water absorption ratio for egg albumen is greater than that assumed in step (c).

5. The method of claim 4, wherein said predetermined typical proportion of egg yolk to egg albumen in whole egg is approximately 70:30 by mass.

6. The method of claim 4, wherein said predetermined typical water level in whole egg is approximately 75% by mass.

7. The method of claim 4, wherein said typical water absorption ratio for egg albumen is approximately 7:1 water:solids by mass.

8. The method of claim 7, wherein said predetermined water absorption ratio for egg albumen is at least 12:1 water:solids by mass.

9. The method of 8 wherein the optimum formulation material cost is determined with respect to cost of egg albumen and increased water level, said method further including the steps of:

(e) calculating the contribution of recipe cost of formulation material by said egg albumen solids by comparing the combined cost of the egg yolk solids and the egg albumen solids with the cost of the equivalent whole egg level;

(f) calculating the formulation cost saving facilitated by the addition of extra water per total solids in the formulation facilitated by the substitution of egg albumen solids;

(g) comparing the additional cost identified in step (e) with the cost saving identified in step (f) and;

optionally repeating steps (d) through (g), using a different predetermined water absorption ratio for egg albumen until the maximum advantageous difference is achieved between the additional cost identified in step (e) and the cost saving identified in step (f) is obtained.

* * * * *